July 23, 1940.  E. E. HALL  2,208,883
ILLUMINATED TIRE CHANGING TOOL
Filed June 19, 1939  2 Sheets-Sheet 2
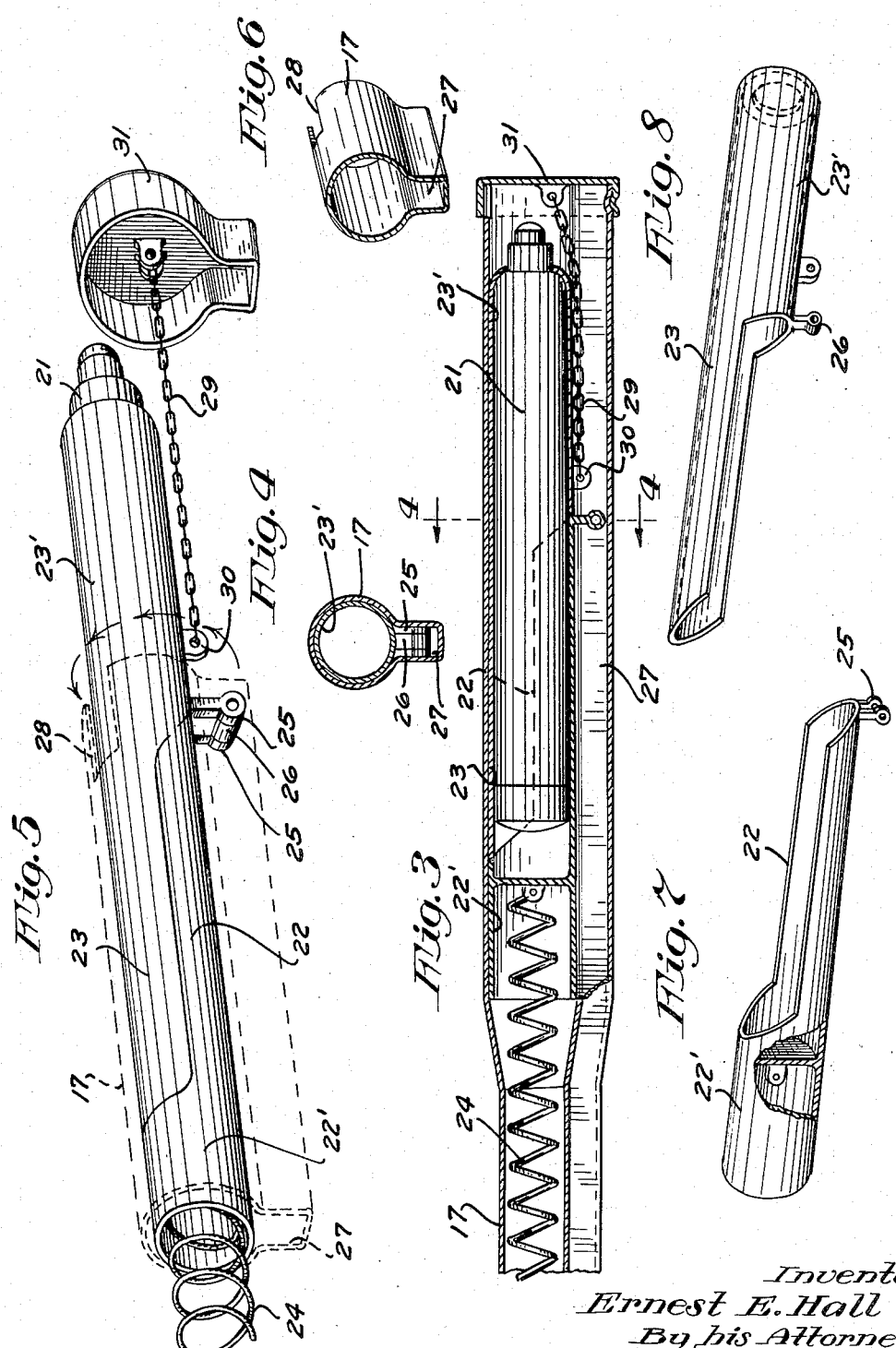
Inventor
Ernest E. Hall
By his Attorneys Patented July 23, 1940

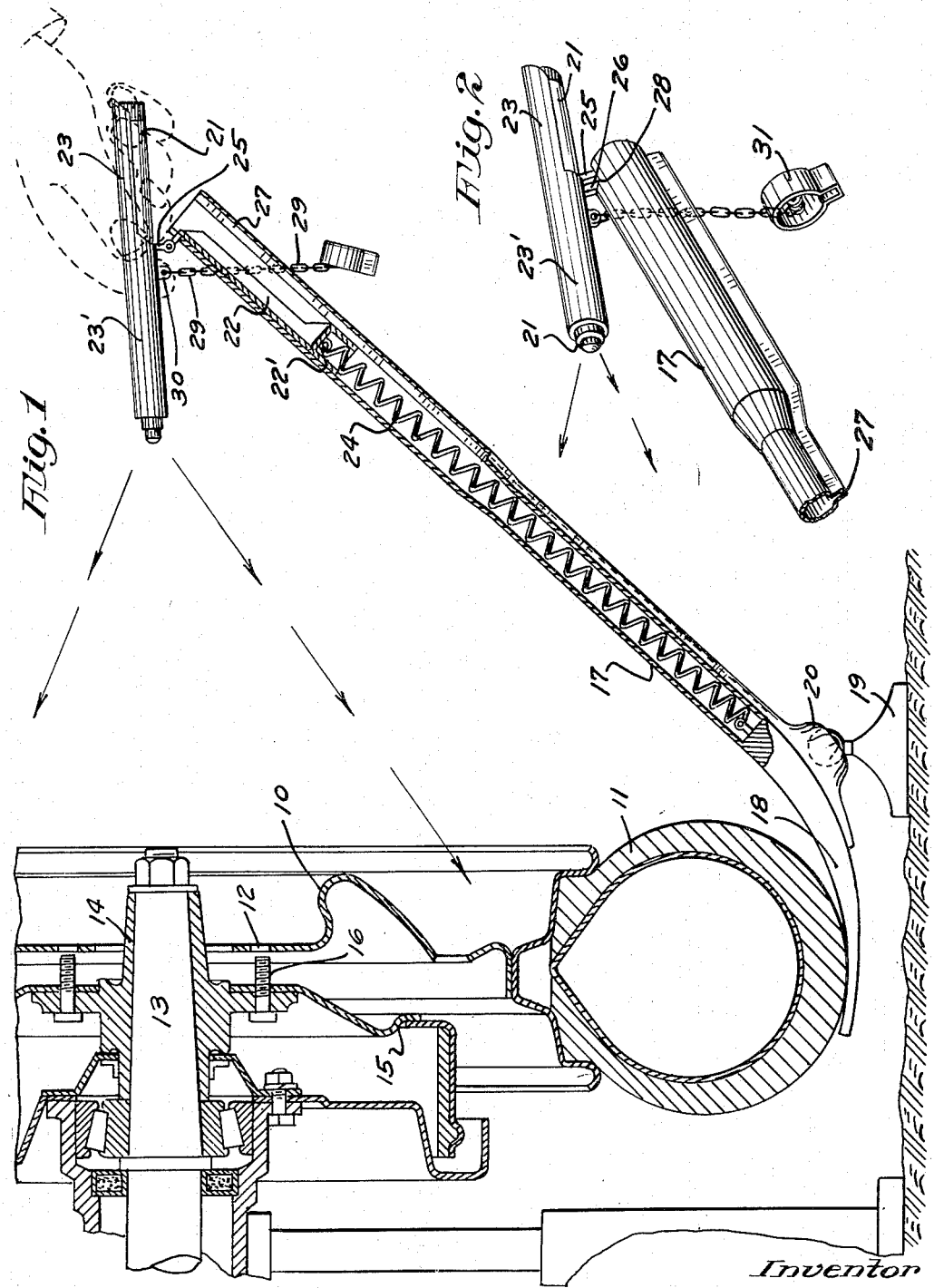

2,208,883

UNITED STATES PATENT OFFICE 2,208,883

ILLUMINATED TIRE CHANGING TOOL

Ernest E. Hall, Morris, Minn.

Application June 19, 1939, Serial No. 279,803

6 Claims. (Cl. 240—6.46)

My invention provides an improved tool that may be designated as an illuminated tire changing tool, but which more particularly is designated and adapted for use in changing tire equipped steel wheels, such as used on heavy trucks.

Tire equipped steel wheels used on heavy trucks are so heavy that it is very difficult for one man to lift the same to position for application. In the standard or conventional interchangeable wheel structures of the character above indicated, the tire equipped steel wheels are detachably connected to the hub and drum flange by studs or bolts usually secured to the hub and adapted to be projected through bolt holes in the wheel.

In practice accurate alignment of the holes with the bolts is required for the application of the wheel. The wheels, as indicated, are so heavy that they can be lifted only with difficulty and seldom by one hand of an operator; and lifting of the wheels, and at the same time accomplishing the alignment of the bolt holes and bolts, is really a two man job. Especially difficult is the accomplishment of the above result at night when the proper alignment cannot be visualized.

My improved tool provides an improved lifting lever combined with a light font such as a flash light. The flash light is adjustably applied to the handle or extended end of the lifting lever and is adjustable to such positions that the light ray can be projected on to the axis of the wheel so that registration of the bolt holes and bolts may be visually determined. The lever can be manipulated by one hand of the operator to lift even the heaviest wheels to position, while the other hand of the operator can be used to steady and align the wheel for application.

A preferred form of the invention is illustrated in the accompanying drawings wherein like characters indicate like parts throughout the several views.

Referring to the drawings:

Fig. 1 is a view showing the improved tool applied to position a tire equipped wheel to the wheel hub and flange, some of the parts being shown in vertical section and some parts being broken away;

Fig. 2 is a side elevation showing the extended end of the lifting lever and the flash light positioned as in Fig. 1;

Fig. 3 is an axial section of the outer end of the lifting lever with the flash light inserted into the tubular end of the lever;

Fig. 4 is a section taken on the line 4—4 of Fig. 3;

Fig. 5 is a perspective showing the flash light and its two-part tubular casing removed from the lever;

Fig. 6 is a fragmentary perspective showing the tubular outer end of the lifting lever;

Figs. 7 and 8 are detailed views in perspective showing the two sections of the casing for the flash light structure.

In Fig. 1 the numeral 10 indicates the tubular steel wheel equipped with customary tire 11 and provided with the customary bolt holes 12. The numeral 13 indicates a wheel axle on which is mounted the wheel hub 14 to which is attached the customary brake drum 15. Hub 14 is provided with projecting bolts or studs 16 that are adapted to be inserted through the bolt holes 12 of the wheel 10 and to be secured thereto by the customary nuts, not shown.

From the foregoing it is obvious that the application of the wheel to the wheel hub structure requires that the bolt holes 12 be preferably aligned with the bolts or studs 16 and that to accomplish this at night or in the dark, requires illumination of the area around the bolt holes and axis of the wheel. Even for the removal of the nuts or the application of the wrench needs illumination at night.

The lifting lever in this preferred form is in the form of a steel tube 17 made solid and strong at its lower or lifting end 18 so that it will properly engage the bottom or ground-engaging portion of the tire. This solid end 18, well back of its point, is equipped with a fulcrum, preferably afforded by a ground engaging foot or block 19 having a rounded head pivotally seated in lug 20 rigidly secured on the bottom of the lever.

The light font which is a cylindrical flash light 21 is mounted for telescopic movement into and out of the tubular end of the lever 17, and when removed is adjustably supported in position to project a light beam on to the operating zone, to wit; the central portion of the wheel and the hub. This flash light may be of the well known commercial or any suitable form preferably having the customary means for turning on and off the battery current. As a holder for the flash light, I provide a two section holder preferably made up of the split sections 22 and 23, which sections, when closed together as shown in Figs. 3 and 4, are adapted to be telescoped into the outer or handle end of the lever. The sections 22 and 23 are formed with tubular end portions 22' and 23' respectively. The semi-tubular portions of these sections 22 and 23 are adapted to be overlapped so as to bring the two sections into alignment and in substantial tubular assembly.

The section 22 is slidable within the lever and is yieldingly drawn inward by a long coiled spring 24 anchored thereto and to the solid end portion of the lever. At its extended end the section 22 has hinge lugs 25 that are pivotally connected to hinge lugs 26 on the intermediate portion of the section 23. As best shown in Figs. 3 and 4 the outer or handle end of the tubular lever is formed with a longitudinal groove or channel 27 that permits the hinge lugs 25 and 26 to slide freely therein when the flash light and its casing are turned as shown in said Figs. 3 and 4. At its outer end 180° from the channel 27 the tubular end of the lever is formed with a lock notch 28 with which the hinge lug 25 is adapted to be engaged and held engaged by the spring 24 when the flash light and its casing are rotated 180° from the position shown in Figs. 3 and 4 and as clearly shown in Fig. 1.

When the flash light is turned to the position shown in Figs. 1 and 2, it will be free for oscillations in a vertical plane, to wit; in the vertical plane that includes the lever and approximately the axis of the wheel and hub so that the central portion of the wheel and its bolt holes will be clearly within the line of vision.

As a convenient means for drawing out the flash light against the tension of spring 24, a light chain 29 is shown as attached to a lug 30 on the bottom of the section 23; and the outer end of this chain is also shown as attached to a cap 31 that is detachably sprung and yieldingly held to close the tubular out end of the lever.

From the foregoing the utility of this device is thought to be evident, but the use thereof may be briefly summarized as follows: A single operator can readily apply even the heaviest of tire equipped wheels first by the use of one hand using the lever to lift the wheel and the other hand to steady and position the wheel for application of the bolt holes 12 over the bolts 16, while the flash light is positioned to illuminate the working zone. This device therefor makes it possible for a single operator to quickly perform work hitherto not capable of being performed by one cperator alone and which has been found to be a slow and difficult job even when performed by two operators, or even in daylight.

The preferred form of the device has been illustrated and this preferred form involves important novel features both generic and specific. It will be understood that various modifications thereof may be made within the scope of the invention herein illustrated, described and claimed.

What I claim is:

1. A device of the kind described involving an intermediately fulcrumed lifting lever, the short lifting end of which is engageable under a tire and the handle end of which is tubular, a slide telescopically movable in the handle end of said lever and yieldingly retracted, a hinge lug at the extended end of said slide, a flash light structure connected to the extended end of said slide by said hinge lug, the tubular handle end of said lever having a notch with which the hinge lug on said slide is engageable to lock said flash light structure in projected position with freedom for pivotal movements in the vertical plane of said lever, said flash light structure when turned into alignment with said slide being movable therewith into the tubular handle end of said lever.

2. The structure defined in claim 1 in which the tubular end of said lever circumferentially remote from said lock notch has a groove adapted to clear said hinge lugs.

3. The structure defined in claim 1 in which the tubular handle end of said lever is provided with a removable cap attached to said slide by a flexible connection.

4. The structure defined in claim 1 in further combination with a ground-engaging fulcrum lock pivotally connected to the intermediate portion of said lever.

5. The structure defined in claim 1 in which said flash light has an attached section adapted to be turned against said slide and together therewith to be moved telescopically into and out of said lever.

6. A device of the kind described involving a lever recessed at one end, a spring retracted slide telescopically movable in the recess of said handle, a light font also telescoped within the recess of said handle and hingedly connected to said slide, said slide having a projecting portion engageable with the open end of said lever to hold said slide temporarily against retracted movements, the said pivotal connection between said slide and light font permitting the latter to be pivotally moved when retracted from said lever.

ERNEST E. HALL.